Figure 3A:
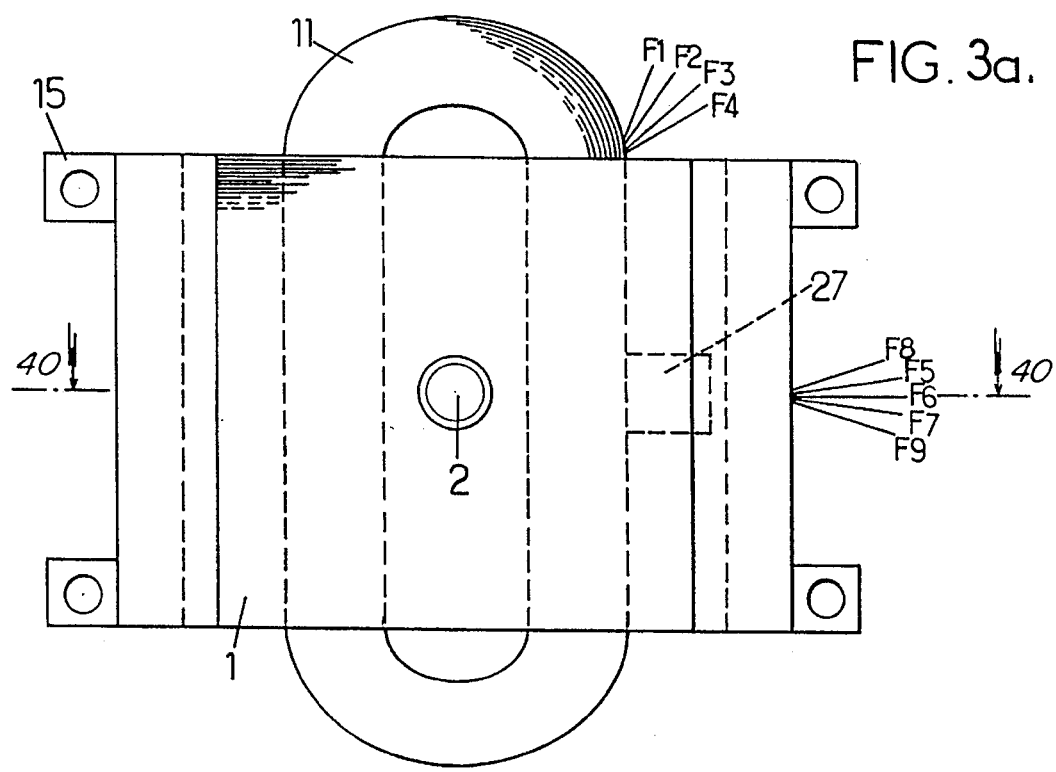

United States Patent [19]
Gennesseaux

[11] Patent Number: 5,621,293
[45] Date of Patent: Apr. 15, 1997

[54] VARIABLE-RELUCTANCE SERVOCONTROLLED LINEAR MOTOR

[75] Inventor: André Gennesseaux, Paris, France

[73] Assignee: Hutchinson, Paris, France

[21] Appl. No.: 981,484

[22] Filed: Nov. 25, 1992

[30] Foreign Application Priority Data

Nov. 26, 1991 [FR] France .................................. 91 14576

[51] Int. Cl.$^6$ ................................................. G05B 11/00
[52] U.S. Cl. ........................ 318/687; 318/653; 318/135; 318/159
[58] Field of Search .................................. 318/687, 132, 318/135, 159, 160, 38, 625, 652, 656–660, 667, 647, 650, 653, 662, 663, 674, 678, 680; 369/152, 160, 170, 179; 335/275, 276, 256

[56] References Cited

U.S. PATENT DOCUMENTS

| | | | |
|---|---|---|---|
| 4,041,529 | 8/1977 | Parker et al. | 335/276 |
| 4,152,570 | 5/1979 | Inoue et al. | 219/69 V |
| 4,331,263 | 5/1982 | Brown | 318/132 X |
| 4,352,048 | 9/1982 | Schulze | 318/135 |
| 4,370,604 | 1/1983 | Griffin | 318/687 |
| 4,431,985 | 2/1984 | Mott | 340/347 AD |
| 4,616,153 | 10/1986 | Lee | 318/687 |
| 4,650,170 | 3/1987 | Fukushima | 267/140.1 |
| 4,717,865 | 1/1988 | Caputo | 318/362 |
| 4,731,569 | 3/1988 | Bohn | 318/678 |
| 4,737,698 | 4/1988 | McMullin et al. | 318/653 |
| 4,785,224 | 11/1988 | Pfalzgraf et al. | 318/663 |
| 5,028,856 | 7/1991 | Zannis | 318/678 |
| 5,042,786 | 8/1991 | Freudenberg et al. | 267/140.1 |
| 5,055,760 | 10/1991 | Nashiki et al. | 318/678 |
| 5,116,029 | 5/1992 | Gennesseaux | 367/140.1 AE |
| 5,257,681 | 11/1993 | Shtarkman et al. | 188/267 |

FOREIGN PATENT DOCUMENTS

| | | |
|---|---|---|
| 0379391 | 7/1990 | European Pat. Off. . |
| 0440536 | 7/1991 | European Pat. Off. . |

OTHER PUBLICATIONS

Technisches Messen TM. vol. 49, No. 2, Feb. 1982, Munchen DE pp. 43–49; P. Krischker et al.: 'Induktiver Differential–Querankergeber hoher Auflosung alinea 2; figures 1,2'.

IEEE Ournal Of Solid State Circuits, vol. 25, No. 2, Apr. 1990, New York, Yassa et al. "A Multichannel Digital Demodulator for LVDT/RVDT Position Sensors".

Soviet Inventions Illustrated, Section EI, Week 8733, 26 Aout 1987, SU–A–1 280 318 (Minsk Wireless Eng) 30 Dec. 1986.

Primary Examiner—William M. Shoop, Jr.
Assistant Examiner—Brian Sircus
Attorney, Agent, or Firm—Larson and Taylor

[57] ABSTRACT

The variable-reluctance servocontrolled linear motor comprises an electromagnet formed by a shell and by a winding around a displacement path, a magnetic portion mobile in the direction of displacement, guided mechanically so as to have a single degree of freedom with respect to the shell, under the effect of the force exerted by the electromagnet. A detector circuit is formed by an inductive or capacitive measurement sensor for the instantaneous value of the air gap and delivers a signal sd representative of the displacement of the mobile magnetic portion. A subtracter circuit receives a displacement control signal e and the signal sd representative of the displacement in order to deliver a displacement error signal ε for the mobile magnetic portion. A current amplifier circuit receives the error signal ε and delivers a supply current to the winding. A restoring element for the mobile magnetic portion exerts on the latter a restoring force opposed to the force exerted by the electromagnet. The restoring element can be mechanical or constituted by a counter-electromagnet.

15 Claims, 5 Drawing Sheets

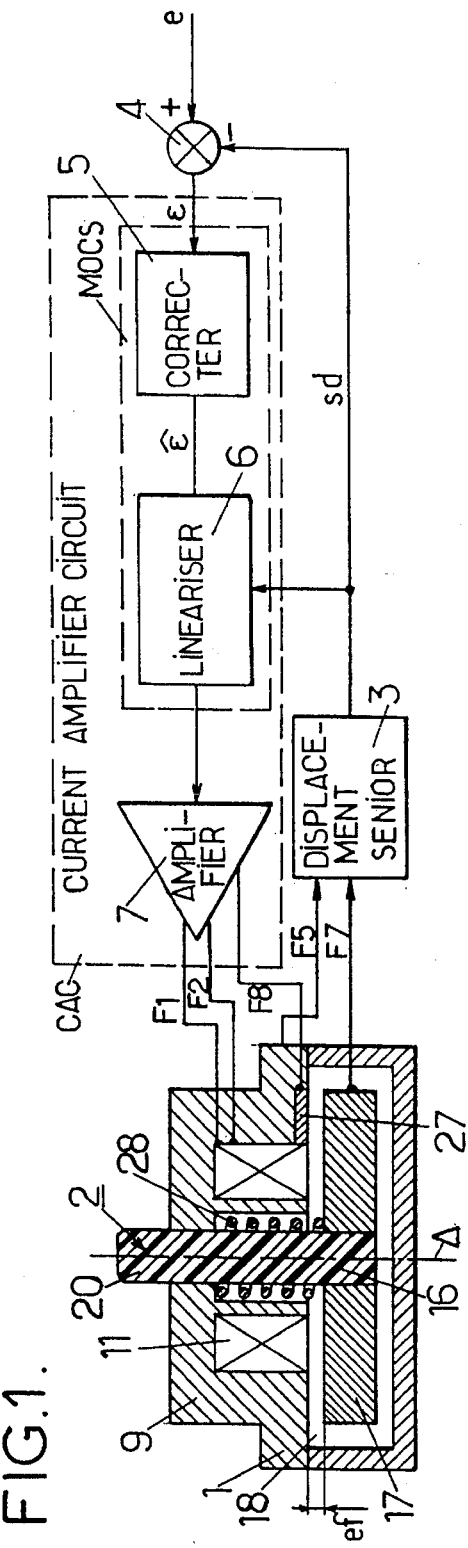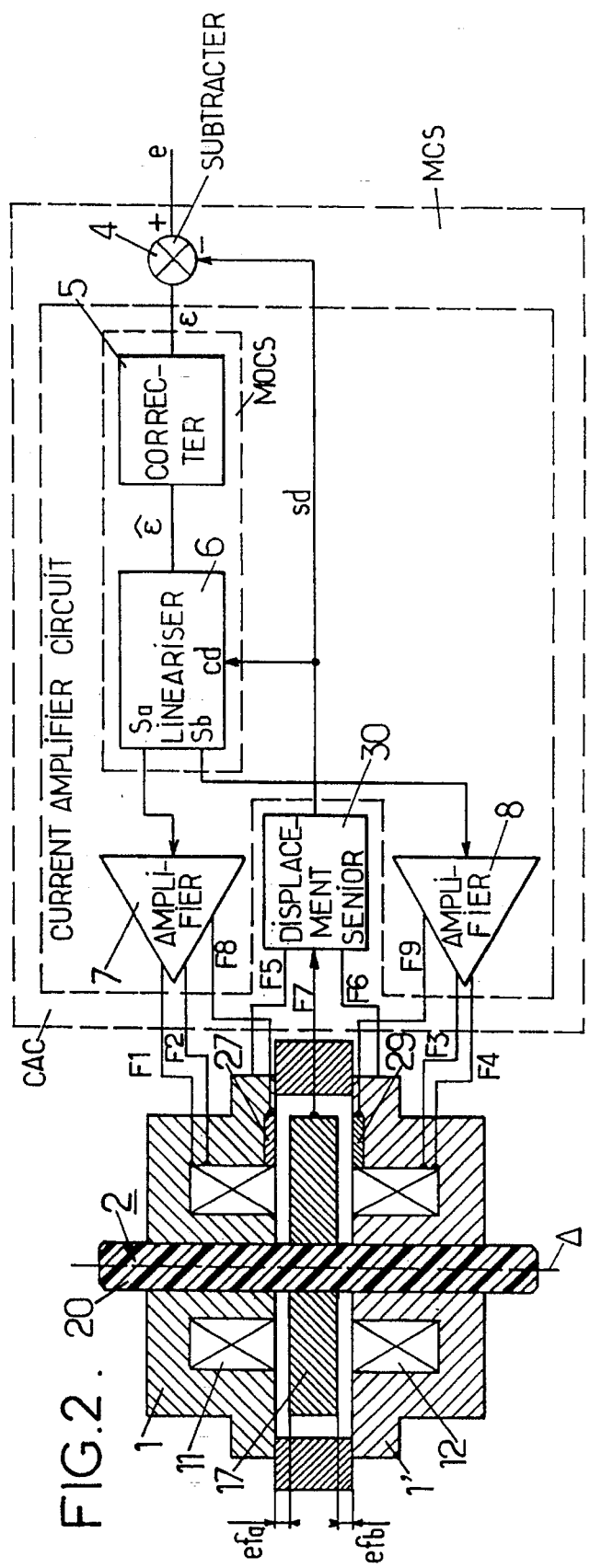
FIG.1.
FIG.2.

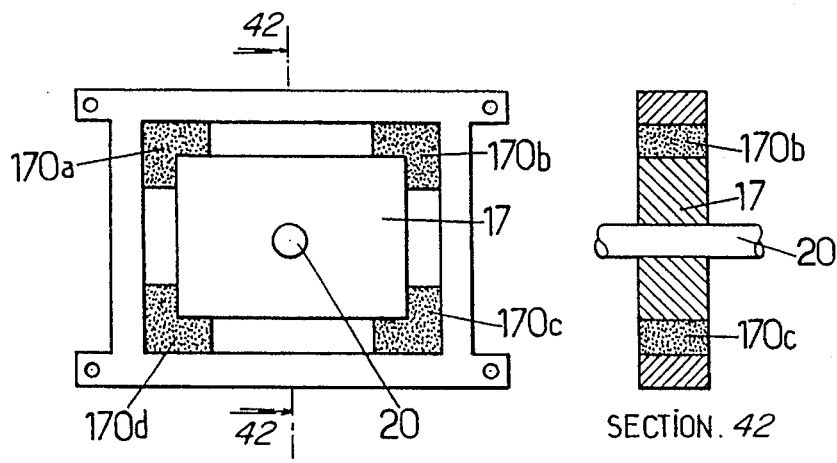
FIG.3c.  FIG.3e.
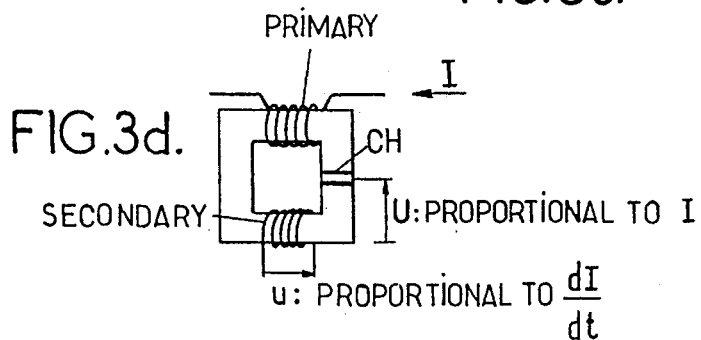
FIG.3d.
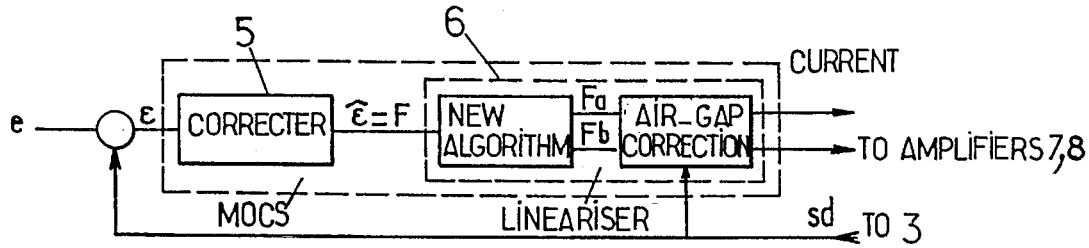
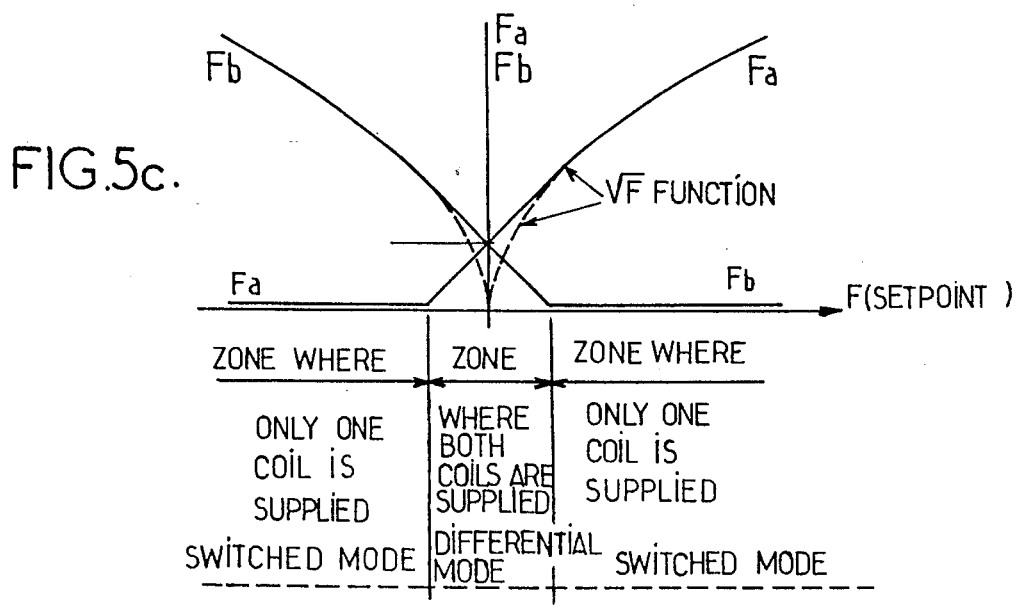
FIG.5c.

VARIABLE-RELUCTANCE SERVOCONTROLLED LINEAR MOTOR

The invention relates to a variable-reluctance servocontrolled linear motor or transducer.

When it is desired to produce linear, especially reciprocating movements, the currently best-known solution consists in using an electro-dynamic motor, such as those which are currently used in loudspeakers. Of very simple design, these types of motor make it possible to obtain a frequency response whose cut-off frequency is high, commonly greater than 20 kHz.

However, this type of motor has disadvantages, such as for example a low value for the force developed by this type of motor for a given mass and given size, by virtue of the use of a permanent magnet. This type of component is also very expensive when higher forces must be developed.

When it is necessary to develop forces of high value, it is advantageous to use an electromagnet.

However, this type of component has the disadvantage of being unstable, the mobile portion attracted by the force developed by the electromagnet then coming into abutment, this type of component essentially being used in systems with two stable positions, relay, bell, etc.

The use of a proportionally controlled electromagnet can therefore only be envisaged through the addition of a position sensor and the consequential servocontrolling of the excitation current for the winding of the electromagnet by the position of the mobile portion.

However, the assembly thus obtained, through the addition of a position sensor, is expensive and bulky, and the servocontrolling of the excitation current for the winding of the electromagnet is tricky to carry out, the servocontrolled variable, the intensity of the excitation current for the winding, and the servocontrol variable, the measurement signal delivered by the position sensor, not being operationally related, thus requiring a calibration and an adjustment of the servocontrol for each type of corresponding apparatus.

The object of the present invention is to remedy the abovementioned disadvantages.

Its object is in particular the implementation of a variable-reluctance servocontrolled linear motor or transducer of small size, and which is very light and inexpensive to implement.

A linear motor is understood to mean a motor or transducer whose mobile portion is subject to a law of displacement, either rotational, or translational, which is substantially proportional to a set point or excitation signal.

Another object of the present invention is the implementation of a variable-reluctance servocontrolled linear motor making it possible to develop forces of sizeable amplitude.

Another object of the present invention is also the implementation of a servocontrolled linear motor exhibiting a frequency response similar to that of the electrodynamic motors of the Prior Art.

Another object of the present invention is finally the implementation of a variable-reluctance servocontrolled linear motor whose linearity characteristics for the linear displacement depend solely on the tolerances for the characteristic values of the components used in the servocontrol chain.

The variable-reluctance servocontrolled linear motor which is the subject of the present invention is notable in that it includes at least one electromagnet, exerting, during operation, a force of attraction and comprising a shell forming a magnetic circuit, and a winding around a linear displacement path. A magnetic portion mobile in the direction of the displacement is provided and guided mechanically so as to have one and only one degree of freedom with respect to the shell of the electromagnet, the direction of the displacement being tangential to that of the lines of the magnetic field created by the electromagnet. A detector circuit of the displacement of the mobile magnetic portion is formed by an inductive or capacitive measurement sensor of the instantaneous value of the air gap existing between the shell and the mobile magnetic portion and delivers a signal representative of the displacement of the mobile magnetic portion. A subtracter circuit receives on a first, positive input, a displacement control signal for the mobile magnetic portion, and, on a second, negative input, the signal representative of the displacement and delivers a displacement error signal for the mobile portion with respect to the displacement control signal. A current amplifier circuit receives the error signal and delivers a supply current for the winding. A restoring system for the mobile magnetic portion is provided and exerts on the latter a restoring force opposed to the force exerted by the electromagnet.

The variable-reluctance servocontrolled linear motor which is the subject of the present invention finds an application in the production of its electromechanical transducers, in particular vibration generators serving in the excitation of structures or in the active control of vibrations, and also in particular in high-fidelity frequency-servocontrolled loudspeakers.

Figure 3B:
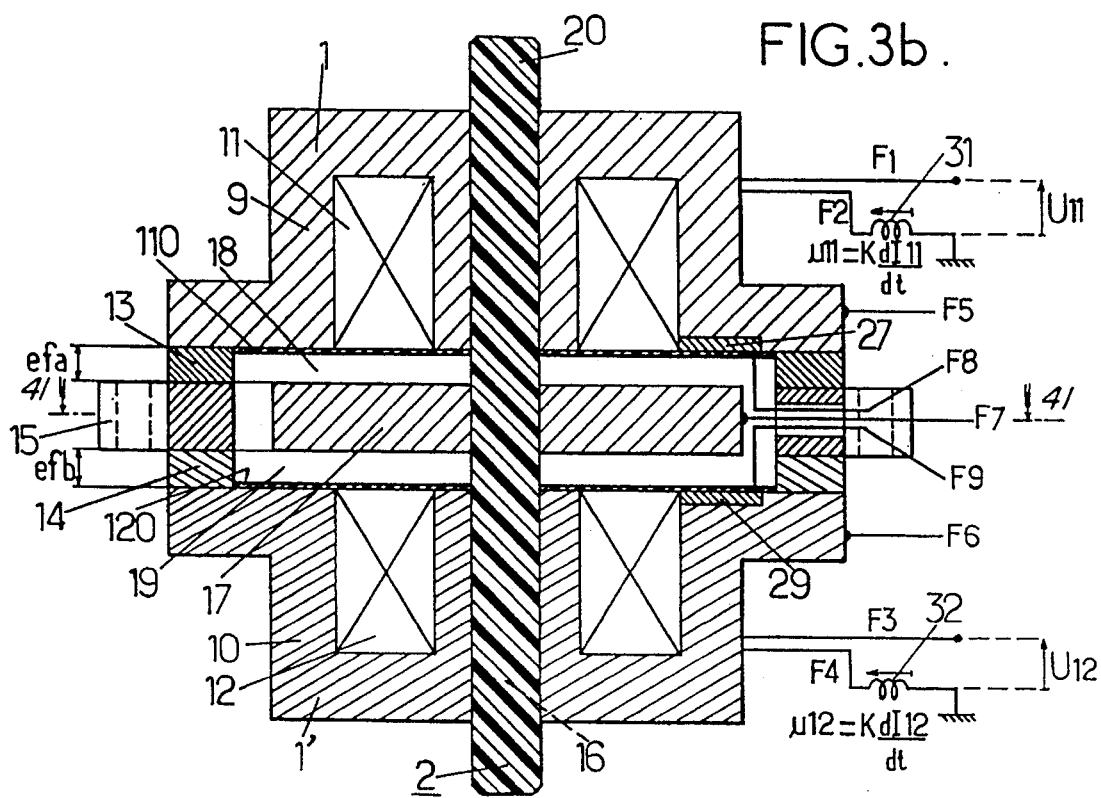

Its subject will be better understood on reading the description and on studying the attached drawings in which:

FIG. 1 represents a general diagram of the variable-reluctance servocontrolled linear motor which is the subject of the present invention, the mobile portion of the motor being capable of being subjected to a translational displacement, FIG. 2 represents a particularly advantageous variant embodiment of the linear motor which is the subject of the present invention represented in FIG. 1, in which differential measurement of the displacement of the mobile magnetic portion is carried out, FIG. 3a represents a plan view of the shell of the variable-reluctance servocontrolled linear motor which is the subject of the present invention, such as represented in FIG. 1 or 2, FIG. 3b represents a detailed sectional view of FIG. 3a along a longitudinal plane of symmetry AA, FIG. 3c represents an embodiment detail of FIG. 3b, FIG. 3d represents a variant embodiment of inductive measurement of the variation in air gap, FIG. 3e represents a sectional view of FIG. 3c taken generally along line 42—42 of FIG. 3c.

Figure 4:
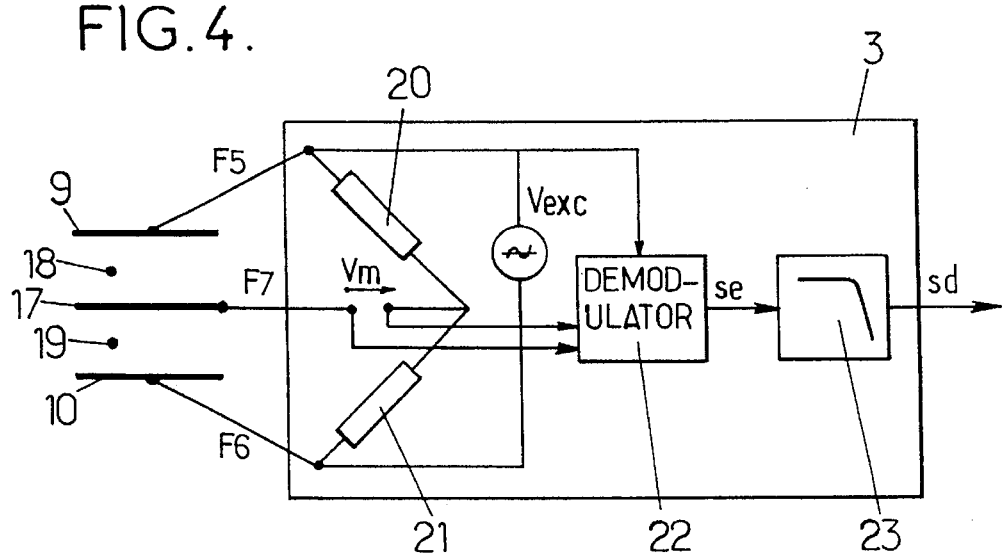
Figure 5A:
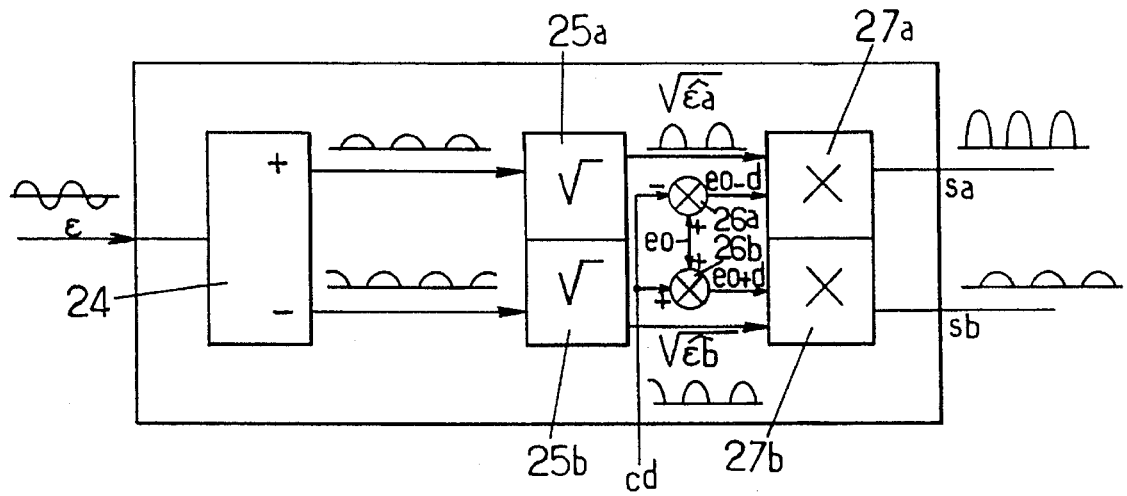
Figure 5B:
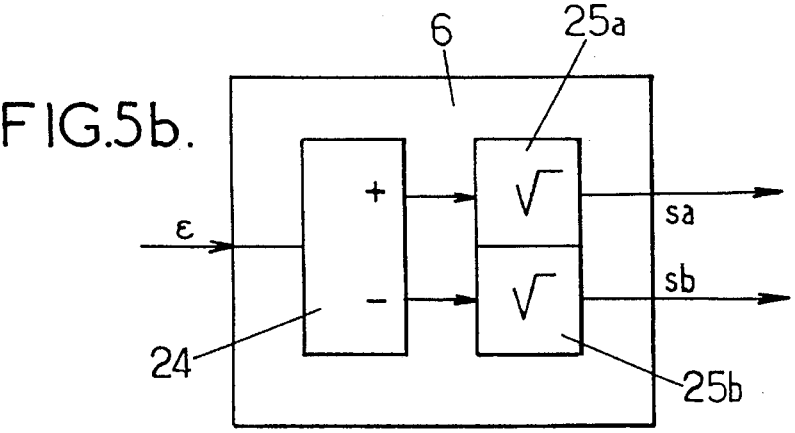
Figure 6A:
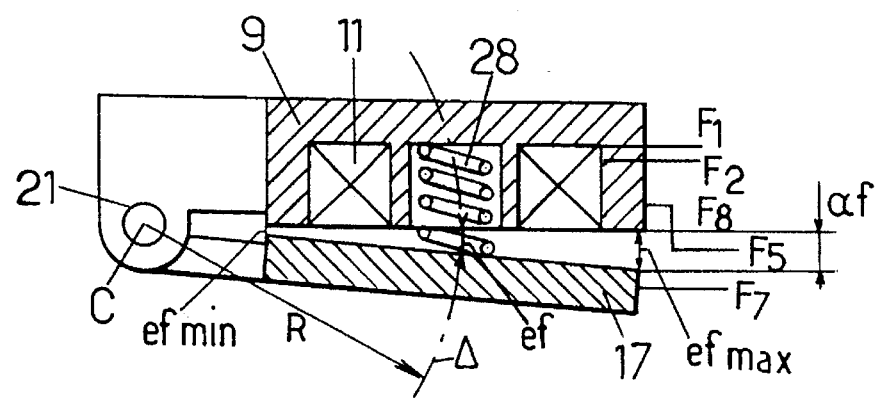
Figure 6B:
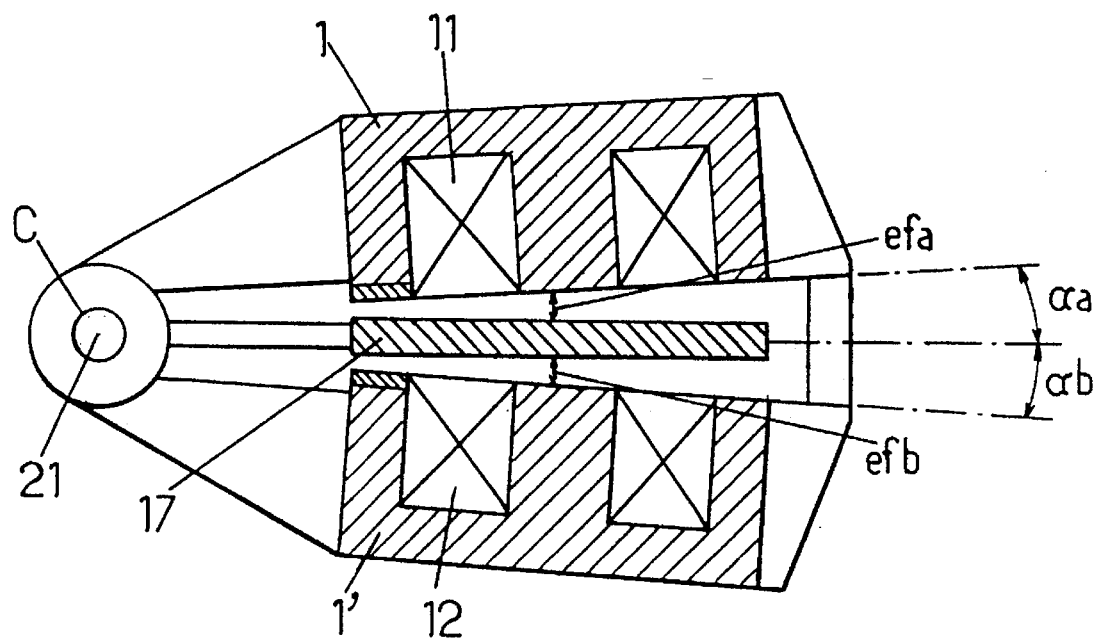

FIG. 4 represents an embodiment detail of a differential sensor of capacitive type more particularly adapted to a use in the case of the embodiment of FIG. 2 or 3b, FIG. 5a represents an embodiment detail of a circuit of FIG. 2, FIG. 5b represents a variant embodiment of the circuit of FIG. 5a in the case where a servocontrolling of the flux of the motor is carried out, as a function of the input displacement control, instead of the servocontrolling of the supply current for the winding of the electromagnet(s) constituting the variable-reluctance servocontrolled linear motor according to the invention, FIG. 5c represents a variant embodiment of the circuit of FIG. 5a, FIG. 6a represents a general diagram of the variable-reluctance servocontrolled linear motor which is the subject of the present invention, the mobile portion of the motor being capable of being subjected to a rotational displacement, FIG. 6b represents an advantageous variant embodiment of the linear motor which is the subject of the invention.

The variable-reluctance servocontrolled linear motor which is the subject of the present invention will firstly be described in connection with FIG. 1.

According to the abovementioned figure, the variable-reluctance servocontrolled linear motor which is the subject of the present invention comprises at least one electromagnet exerting, during operation, a force of attraction, this electromagnet comprising, as represented in the abovementioned figure, a shell 1 forming a magnetic circuit 9, and a toric winding 11 around a direction Δ of linear displacement.

Furthermore, a mobile magnetic portion 17 is provided, this magnetic portion generally being of the same cross-section as that of the electromagnet.

In the embodiment of the linear motor which is the subject of the invention in which the mobile magnetic portion 17 is able to displace translationally, this portion can include a guide element 2, formed for example by a finger 20 for guiding displacement along the displacement path symbolised by the direction Δ of linear displacement with respect to the shell 1, this displacement of course being developed under the effect of the force of attraction exerted by the electromagnet. The guide element 2 can be formed by any means equivalent to the finger 20. Advantageously, the finger 20 can be mounted on a suspension with two deformable bearings made of elastomer or of metal.

The solutions described earlier in the description do not make it possible to completely immobilise the mobile part 17 so as to inhibit any rotational motion about the spindle 20. The magnetic parts not being axisymmetric, any spurious rotational motion is likely to provoke their dealignment. This risk can be eliminated by installing, as represented in FIG. 3c, a sectional view along the section plane BB of FIG. 3b, rubber bearings 170a, 170b, 170c, 170d. These bearings are preferably installed in the region of the corners of the mobile part 17 and enable the latter to be locked by suppressing its rotational degree of freedom.

Finally, when a suspension with two bearings is used, one of the bearings can be constituted by the abovementioned corner bearings, the other bearing, constituted by a loudspeaker diaphragm, for example, possibly being installed on the load.

A detector circuit 3 of the displacement of the mobile magnetic portion 17 is provided and delivers a signal, denoted sd, representative of the displacement of the mobile magnetic portion with respect to the shell 1 of the electromagnet. This detector circuit 3 is formed by an inductive or capacitive measurement sensor of the instantaneous value of the air gap 18, this value being denoted ef in FIG. 1, existing between the shell 1 and the mobile magnetic portion 17 mentioned earlier.

A subtracter element 4 is provided and receives on a first, positive input, a displacement control signal $e$ for the mobile magnetic portion 17 and on a second, negative input, the signal representative of the displacement, sd. The subtracter element 4 delivers a displacement error signal $\epsilon$ for the mobile portion 17 with respect to the displacement control signal.

A current amplifier circuit CAC, receives the error signal $\epsilon$ and delivers a supply current to the winding 11 of the electromagnet through wires F1, F2.

Finally, a restoring element, 28, is provided so as to restore the mobile magnetic portion 17 by exerting on it a restoring force directed opposite to that of the force exerted by the electromagnet.

The operation of the variable-reluctance servocontrolled linear motor which is the subject of the present invention such as represented in FIG. 1 is as follows:

when the winding 11 of the electromagnet is supplied with current, a force of attraction of the electromagnet thus supplied is exerted on the mobile magnetic portion 17 thereby causing a displacement of the latter by attraction towards the shell 1, the restoring element 28, as represented in FIG. 1 in a non-limiting manner by a mechanical element, makes it possible to maintain in dynamic equilibrium the rig constituted by the mobile magnetic portion 17 and the guide finger 20 along the direction of displacement Δ. The displacement itself is controlled and the force exerted by the electromagnet is servocontrolled as a function of the displacement of the mobile magnetic portion 17. For this purpose, the displacement detector circuit 3 makes it possible to measure this displacement of the mobile magnetic portion 17, that is to say of the instantaneous value of the air gap ef, according to a constant of proportionality to the value of the displacement control signal e; this constant depends only on the parameters of the servocontrol circuit, which will be described in more detail later in the description.

As has been represented in FIG. 1 in a non-limiting manner, the restoring element 28 can be constituted by a mechanical element such as a restoring spring of helical spring type for example. The latter is then engaged on the finger 20 for guiding displacement of the mobile magnetic portion 17, as represented in FIG. 1 abovementioned. The assembly formed by the guide finger 20 and the spring 28 is then mounted slidably in a housing 16 in the shell 1.

The embodiment of FIG. 1 is satisfactory from the point of view of its operation.

However, the linear motor according to the invention, such as described earlier, has the following limitations:

non-linear relation between the air gap and the value of the capacitance, which shows up in the voltage/displacement characteristic of the sensor, no absolute position reference, significant risk of drift, resulting from the abovementioned limitations.

Another embodiment of the variable-reluctance linear motor which is the subject of the present invention which aims to eradicate the abovementioned limitations will now be given in connection with FIG. 2.

According to the abovementioned FIG. 2, the restoring element 12 is constituted by a counter-electromagnet. In FIG. 2, the electromagnet is constituted by the shell 1 forming a magnetic circuit 9, the winding 11 and the direction of displacement Δ symbolised by the guide finger 20, whereas the counter-electromagnet is formed by a second shell 1', symmetric with the first shell 1, a second similar winding 12, the counter-electromagnet and the electromagnet being arranged facing one another, on either side of the mobile magnetic portion 17, as represented in FIG. 2. Thus, as will be seen in FIG. 2 abovementioned, the guide finger 20 for the mobile magnetic portion 17 extends symmetrically with respect to the mobile magnetic portion 17 and the guiding of the mobile magnetic portion 17 in the course of operation is simultaneously ensured by the shell 1 of the electromagnet and by the shell 1' of the counter-electromagnet.

Furthermore, a circuit for symmetric control, denoted MCS, of the electromagnet, respectively of the counter-electromagnet, makes it possible to deliver to the respective windings 11, 12, of these latter, a supply current under symmetric excitation, as will be explained later in the description.

A more detailed description of the mechanical portion of the variable-reluctance servocontrolled linear motor which is the subject of the present invention will now be given in connection with FIGS. 3a and 3b.

In FIG. 3a, there is represented a plan view of the mechanical portion of the servocontrolled linear motor which is the subject of the present invention.

As can be seen in FIG. 3a abovementioned, the motor comprises the shell 1 or frame, formed in fact by the electromagnet and the counter-electromagnet as mentioned earlier.

Preferably, the shell 1 as well as the shell 1' of the counter-electromagnet can advantageously be formed by a magnetic circuit 9, 10, as represented in FIG. 3b, which is a sectional view along the plane of symmetry AA of FIG. 3a.

Each magnetic circuit can advantageously be formed by a magnetic circuit made from a laminated or sintered ferromagnetic material so as to limit magnetic losses. Finally, an electrical winding 11, respectively 12, is provided in order to form the electromagnet, respectively the counter-electromagnet. Each winding is then supplied through two supply wires, F1, F2, respectively F3, F4. The electromagnet, respectively the counter-electromagnet, are held a fixed distance from one another by mechanical connection parts, denoted 13, respectively 14, the part 15 as represented in FIGS. 3a and 3b serving in the fixing of the shell, for example. It will be noted that the mobile rig is formed of a rod forming a guide finger 20 and constructed from plastic, such as a plastic of the self-lubricating type. The rod 20 is plugged into the mobile magnetic portion 17, itself formed by a plate made from sintered or laminated ferromagnetic material so as to limit the corresponding magnetic losses. The rig constituted by the rod 20 forming a guide finger and by the mobile magnetic portion 17 is guided in translation by the guide finger 20, which finger passes through the shell 1, 1' of the electromagnet, respectively of the counter-electromagnet. The passages made in the abovementioned shell are preferably set so as to minimise the friction between the rod proper 20 and the wall of the orifices permitting passage of the said rod. The mobile magnetic portion 17 is thus held parallel to the electromagnet, respectively to the counter-electromagnet, by way of the abovementioned set passages, during its displacements in the course of the operation of the variable-reluctance servocontrolled linear motor which is the subject of the present invention. Such an operational mode has the effect of delimiting, in fact, in the course of operation, two variable air-gaps, 18 and 19, which have values, as represented in FIG. 3b, efa, respectively efb, with efa+efb=constant. The operational mode of the the variable-reluctance servocontrolled linear motor which is the subject of the present invention such as represented in FIG. 2 and 3a, 3b is as follows.

The supplying of one or the other of the windings 11 or 12 with a supply current delivered by the supply wires F1, F2, respectively F3, F4, causes a force of attraction of the electromagnet, respectively of the counter-electromagnet, thus supplied, on the mobile magnetic portion 17. Thus, the latter's displacement is ensured in one direction or in the other. In order for this displacement to be controlled, the force applied by the electromagnet, respectively the counter-electromagnet, is servocontrolled as a function of the displacement of the mobile magnetic portion 17.

The abovementioned servocontrol is carried out by means of a detector circuit of the displacement of the mobile magnetic portion 17, which will be described in connection with FIGS. 4 and 5a, 5b below.

Generally, the symmetric control circuit MCS advantageously includes a detector circuit 30 of the differential displacement of the mobile magnetic portion 17, this detector circuit 30 delivering to the negative terminal of the subtracter 4 a signal sd representative of the differential displacement of the mobile magnetic portion with respect to the shell 1, 1', of the electromagnet with respect to an equilibrium origin position.

Furthermore, a supply current amplifier circuit, denoted CAC, under symmetric excitation, is provided, this circuit including, on the one hand, a module denoted MOCS for symmetric control receiving the error signal ε delivered by the subtracter circuits 4, and delivering a first and a second symmetric excitation control signal, denoted sa, sb. The supply current amplifier circuit under symmetric excitation, CAC, includes, on the other hand, two current amplifiers 7, 8 receiving the first, respectively the second, symmetric excitation control signal, and delivering to the winding of the electromagnet 11, respectively of the counter-electromagnet 12, a corresponding supply current under symmetric excitation.

Generally, it will be noted that the principle of the measurement of the displacement of the mobile magnetic portion 17 consists in measuring a magnitude which varies with the air gaps 18 and 19 previously mentioned, and in particular the values efa, efb, of the latter, or better with their difference.

According to a first particularly advantageous aspect of the the variable-reluctance linear motor which is the subject of the present invention, is the abovementioned measurement can be carried out inductively or capacitively.

The inductive method consists in measuring the inductance of the two windings 11 and 12, as a function of the corresponding air-gap values.

The abovementioned inductance has the value:

$$L = \frac{\mu 0 S \cdot N^2}{2ef}$$

a relation in which

μ0 is the permeability in the air gap,

S is the electromagnet's iron area,

N is the number of turns of the winding, ef is the length of the air gap, that is to say the instantaneous value efa or efb for each relevant air gap.

The value of the abovementioned inductances can the be easily calculated by measuring, on the one hand, the voltage across the terminals of each winding, and the derivative of the supply current to these latter, it being possible to measure the value of the derivative of this current from an auxiliary winding of small known value, the instantaneous voltage across the terminals of this auxiliary winding representing the value of the derivative of the supply current for the relevant winding.

In FIG. 3b have been represented the auxiliary windings 31 and 32 associated with the winding 11, respectively 12, each delivering respectively a voltage:

$$u11 = K \frac{dI11}{dt}$$

$$u12 = K \frac{dI12}{dt}$$

A measurement of the voltage U11, respectively U12, applied to the winding 11, respectively 12, of the electromagnet and of the counter-electromagnet and the measurement of the voltages across the terminals of the auxiliary windings 31 and 32, u11, u12, then makes it possible to determine the corresponding values of L the inductance of the electromagnet, respectively of the counter-electromagnet, and finally, the corresponding air-gap values efa, efb. It will be noted in particular that the abovementioned values of voltage can be measured by sampling, analogue-digital conversion, it then being possible to carry out the calculation digitally for example.

A more advantageous solution can consist in using an isolating transformer, supplied at the primary by the current I, which makes it possible furthermore to adapt the level of the measured signal. Conventionally, as represented in FIG. 3d, the voltage $\vec{u}$ delivered by the secondary of the isolating transformer is thus proportional to dI/dt and to ef.

Furthermore, by virtue of the isolating transformer, it is possible to measure the current I flowing in the electromagnets. Knowledge of the value of this current is necessary when the amplifiers 7 and 8 are servocontrolled in current. For this purpose, a Hall-effect sensor CH is installed in the magnetic circuit of the isolating transformer, which delivers a voltage U proportional to I, this type of sensor is easy to implement.

However, a capacitive measurement of the value of the air gap, or a differential measurement of the latter, is technically simpler to implement. Such a measurement consists, in fact, in measuring the capacitance which exists between the electromagnet and the mobile magnetic portion 17, that is to say between two conductive surfaces separated by a small-size air gap and therefore constituting a capacitor whose capacitance C depends strongly on the value of the air gap. This value is given by the well known relation:

$$C = \frac{\epsilon 0 S}{ef}$$

where
- $\epsilon 0$ is the permittivity in the air gap, the dielectric being air,
- S is the conductive area of the electromagnet,
- ef is the value of the air gap, that is to say the value efa or efb, when considering the electromagnet or the counter-electromagnet.

Of course, the value of this capacitance can be measured in any known way. However, in the case where the motor is symmetric, as well as in the embodiment of FIG. 2 and 3b, a differential method appears most suitable.

In such a case, the sensor circuit 3 can advantageously be produced in the form of the differential displacement detector circuit 30, such as represented in FIG. 2 and 4.

The electromagnet and the counter-electromagnet, the mobile magnetic portion 17, and the 2 air gaps 18 and 19 then constitute a double capacitor, which, as represented in FIG. 4, is connected by connection wires F5, F6 and F7, to a measurement bridge comprising equal resistances 20 and 21. These resistances can be constituted by precision resistors.

As will be recognised in the abovementioned FIG. 4, the measurement bridge circuit advantageously includes two first adjacent branches formed by the capacitances of the abovementioned air gaps 18, 19, constituted by the shell 1 of the electromagnet and the first side of the facing mobile magnetic portion 17, respectively by the shell 1' of the counter-electromagnet, and the second side of the facing mobile magnetic portion 17. The bridge measurement circuit comprises two second adjacent branches formed by the resistors 20 and 21.

Furthermore, a first diagonal of the bridge measurement circuit is formed by a generator 220 of periodic signals whose fundamental frequency is much greater than the cut-off frequency of the servocontrolled linear motor. By way of non-limiting example, for a servocontrolled linear motor whose cut-off frequency is for example 2 kHz, the fundamental frequency of the signal delivered by the generator 220 can be chosen equal to 50 kHz.

The second diagonal of the measurement bridge delivers a differential signal for measurement, denoted vm, between the mobile magnetic portion 17 and the common point of the two second adjacent branches formed by the standard resistors 20 and 21.

A demodulator circuit 22 receives, on the one hand, the differential signal for measurement, vm and, on the other hand, the periodic excitation signals delivered by the generator 220, so as to ensure a demodulation of the differential measurement signal, the demodulator circuit thus delivering, in a conventional manner, the amplitude envelope signal of the differential measurement signal vm. This signal is denoted se in FIG. 4.

Finally, a filtering circuit 23 of low-pass filter type is provided, this circuit receiving the envelope signal se, and delivering the signal sd representative of the differential displacement of the mobile magnetic portion 17.

This filter suppresses the high-frequency demodulation products.

The operation of the circuit as represented in FIG. 4 is as follows:
the measurement signal vm delivered at the output of the measurement bridge is an alternating signal of the same frequency as the excitation voltage delivered by the generator 220. This measurement signal satisfies the relation:

$$vm = \frac{vexc \cdot d}{2 \cdot e0}$$

a relation in which:
- vexc is the value of the AC excitation voltage,
- d is the displacement of the mobile magnetic portion 17 with respect to the middle of the device, the value d being null when efa=efb,
- e0 is the value of the air gaps when the mobile magnetic portion 17 is in the middle position, that is to say efa=efb=e0.

The advantages of the differential measurement method then emerge immediately:
- the value of the measurement signal vm is linear, that is to say it is proportional to the displacement d, which was not the case for the previous methods.
- it is absolute since the measured voltage equals 0 when the mobile magnetic portion 17 is in the middle position, which again was not the case in the previous methods;
- drifting is minimised since symmetry is preserved and hence the drifting is compensated automatically.

Thus, as will also be noted in regard to the devices of the Prior Art, the detector device used such as described in connection FIGS. 3b and 4, for example, is no longer a distinct, expensive and bulky element, which it is necessary to add.

Indeed, it is sufficient to connect up the corresponding wires such as represented in FIGS. 3b and 4, the wires F5, F6 and F7, to the corresponding existing parts. The one slight constraint to be complied with is the requirement, in order to carry out the measurement by the capacitive method, that the various parts must be electrically insulated from one another. That is to say that the rod 20 constituting the guide finger must be produced from an insulating material, made of a self-lubricating plastic for example, as must the previously mentioned connecting parts.

The insulating parts can furthermore be of ceramic, thus making it possible to obtain greater rigidity.

In order to obtain better precision of measurement and of capacitive detection, the portions of shells 1 and 1' facing the first, respectively the second side of the mobile magnetic portion 17 can advantageously be provided, as represented in FIG. 3b, with an electrically conductive coating 110, 120. The electrically conductive coating can advantageously be formed by a metallised plastic film whose metallisation is electrically connected or not to the potential of each corresponding shell 1 or 1'. Such a coating 110, 120, makes it possible to improve the equating of the characteristics of each capacitor formed by the air gaps efa, efb, to those of a flat capacitor, and hence the precision of the measurement.

However, the electrodes formed by the coating 110, 120, are disturbed by capacitive coupling with the coils 11 and 12, whose potential is variable. The noise level of the sensor thus formed can be suppressed or greatly reduced by covering each coil with a shielding plate connected to the reference potential. The shielding plate, covering the coil, has a cut-out so that this plate cannot constitute a turn completely surrounding a zone subject to a variable magnetic flux.

Furthermore, in order to avoid the appearance of sizeable eddy currents in the electrodes 110 or 120, the latter can advantageously be configured as a loop-free divided structure such as a comb structure. The shielding plate and the divided electrode can then be produced according to the techniques for flexible, two-sided printed circuits, the side containing the shielding plate being applied to the corresponding coil.

The demodulation performed by the demodulator 22 makes it possible to obtain a DC output voltage by virtue of the demodulation performed by the frequency of the excitation signal delivered by the generator 220, and then of the low-pass type filtering by the filter 23. The signal sd delivered at the output of the low-pass filter 23 and at the output of the detector circuit 3 or 30 is then proportional to the displacement d of the mobile magnetic portion 17.

Of course, the subtracter circuit 4 then effects the difference between the signal sd representative of the displacement of the mobile magnetic portion 17, and the displacement control signal e, which of course represents the displacement set point for the rig constituted by the mobile magnetic portion 17 and by the finger 20. The output signal $\epsilon$ or error signal delivered by the subtracter 4 represents the error between the actual position and the position requested of the above-mentioned rig. It will be noted that the subtracter circuit 4 can advantageously be produced by means of an operational amplifier mounted as a differential amplifier.

An advantageous non-limiting embodiment of the module MOCS for linear symmetric control will be given in connection with FIGS. 2 and 5a, then 5b.

Generally, it will be understood that the module MOCS for linear symmetric control advantageously comprises a servocontrol corrector circuit 5 making it possible to ensure the stability of the servocontrol as a function of the mechanical impedance or load to which the motor, which is the subject of the present invention, is connected. This circuit receives the error signal $\epsilon$ delivered by the subtracter circuit 4 and delivers a corrected error signal $\hat{\epsilon}$. The servocontrol corrector circuit 5 will not be described since it corresponds to a circuit of conventional type within the field of servocontrolled motors, this type of circuit being intended primarily to improve the performance of the servocontrol in terms of response time and of damping.

Finally, the module MOCS for linear symmetric control furthermore comprises a lineariser circuit 6 making it possible to ensure control of the windings 11, 12, of the electromagnet, respectively of the counter-electromagnet, by servocontrolling the current or the magnetic flux traversing these electromagnets, so as to render the displacement of the mobile magnetic portion 17 and of the finger 2 linear along the direction of displacement $\Delta$ with respect to the input control signal e.

A first embodiment of the lineariser circuit 6 will be described in connection with FIG. 5a.

In this case, when a servocontrol in current is to be carried out, that is to say a servocontrol of the current traversing the winding 11 of the electromagnet, respectively the winding 12 of the counter-electromagnet as a function of the input control signal e, the lineariser circuit 6 advantageously comprises a rectifier-separator circuit 24 delivering from the corrected error signal $\hat{\epsilon}$, delivered by the servocontrol corrector circuit 5, the rectified positive, respectively negative half-cycles of the corrected error signal $\hat{\epsilon}$.

It will be noted that generally, the circuit 24 in fact delivers the rectified, positive, respectively negative values of the corrected error signal $\hat{\epsilon}$, the latter being presumed to correspond to an alternating input signal e for which the error signal $\epsilon$ and the corrected error signal $\hat{\epsilon}$ are themselves formed by a signal with positive and negative half-cycle.

By way of non-limiting example, the rectifier separator circuit 24 can be constituted by two half-cycle alignment circuits of conventional type, a first circuit making it possible to align the positive half-cycles from the value 0, and a second circuit, similar to the first, making it possible to align the negative half-cycles on the value 0. This type of conventional circuit will not be described since it is entirely known to the expert.

Furthermore, as represented in FIG. 5a, the lineariser circuit 6 can advantageously comprise a first, 25a and a second, 25b, circuit for calculating the square root of the amplitude of the rectified, positive, respectively negative half-cycles of the corrected error signal $\hat{\epsilon}$. The abovementioned circuits 25a and 25b can be produced by analogue circuits and deliver signals proportional to $\sqrt{\hat{\epsilon}b}$, and $\sqrt{\hat{\epsilon}b}$ respectively.

Finally, the lineariser circuit 6 comprises a first, 27a, and a second 27b, correction multiplier circuit receiving respectively the signals $\sqrt{\hat{\epsilon}a}$ respectively $\sqrt{\hat{\epsilon}b}$, delivered by the calculation circuits 25a, 25b. A subtracter circuit 26a and a summing circuit 26b receive, on the one hand, the differential detection signal sd, proportional to d, the displacement of the mobile magnetic portion 17, and, on the other hand, a signal representative of the value eo of the air gaps when the mobile magnetic portion 17 is in the middle position and deliver signals representative of the values eo–d, eo+d to the first, 27a, respectively second, 27b, correction circuit.

These circuits 27a and 27b deliver a first, sa, respectively a second, sb, symmetric control signal to the first 7, respectively second, 8, current amplifier.

The lineariser circuit 6, as represented in FIG. 5a, makes it possible to ensure a linearisation of the non-linear characteristics of the electromagnets, as regards the expression for the force which these latter engender as a function of the current traversing the corresponding windings.

In fact, the force engendered by the electromagnet, respectively the counter-electromagnet, satisfies the relation:

$$F = \frac{\mu 0 S (NI)^2}{4 \cdot ef^2}$$

a relation in which $\mu 0$ is the permeability of the air gap,

S is the iron area of the relevant electromagnet,

N is the number of turns of the winding of the electromagnet,

I is the current flowing in the winding of the electromagnet, ef is the value of the air gap, either efa, or efb.

The abovementioned force therefore varies as the square of the current and as the inverse of the square of the value of the air gap.

The control signal $\hat{\epsilon}$ for the lineariser 6 represents the force set point. The latter is, firstly, separated into its positive portion and into its negative portion by the circuit 24 described previously by virtue of the fact that an electromagnet can only engender attractive forces. Depending on the sign of the force to be engendered, it is necessary to supply one or other of the windings of the electromagnet, respectively of the counter-electromagnet. The circuit 25a or 25b makes it possible to calculate the square root of the signal, and the circuit 27a or 27b multiplies the result by a voltage representative of the instantaneous value of the air gap, that is to say proportional to e0+d or to e0−d, depending on the value efa, efb of the relevant air gap 18 or 19.

In this way, when the force set point input is $\hat{\epsilon}$, positive, the output from the circuit 25a is equal to $\sqrt{\epsilon}$, and that from circuit 27a is equal to efa.$\sqrt{\epsilon}$. The current amplifier 7 translates the value of this set point into a current I proportional to efa.$\sqrt{\epsilon}$. Since the force delivered by the winding 11 is proportional to $$\left(\frac{I}{efa}\right)^2$$

and since the current I is proportional to efa.$\sqrt{\hat{\epsilon}}$, the resultant force is therefore proportional to $$\left(\frac{efa \cdot \sqrt{\hat{\epsilon}}}{efa}\right)^2$$

namely finally to $\hat{\epsilon}$.

Clearly in this way a force proportional to the set point failure $\hat{\epsilon}$ is obtained.

However, the servocontrol can be rendered more powerful by servocontrolling the magnetic flux in the electromagnet and the counter-electromagnet to the value of the displacement control set point signal e rather than by servocontrolling the current.

For this purpose, the shell 1 of the electromagnet and the shell 1' of the counter-electromagnet advantageously include, in the region of the air gap 18, 19, a Hall-effect measurement probe 27, 29, as represented for example in FIG. 3b. The Hall-effect measurement probe 27, 29 delivers, by way of connection wires F8, F9, a signal representative of the magnetic flux developed in the corresponding air gap 18, 19, to the current amplifier 7, respectively 8, as represented in FIG. 2. Thus, the magnetic flux in the air gap is proportional to the set point input of the current amplifiers 7 and 8.

The force developed by the electromagnet, respectively the counter-electromagnet, satisfies the relation:

$$F = \frac{B^2 \cdot S}{\mu 0}$$

a relation in which

B is the magnetic flux in the air gap,

S is the iron area of the electromagnet or of the counter-electromagnet,

μ0 is the permeability in the air gap.

It will be noted that in such a case, the linearisation procedure is simplified since the expression for the force exerted by the electromagnet, respectively the counter-electromagnet, no longer varies with the value of the air gap.

In this case, as represented in FIG. 5b, the lineariser circuit is simplified and comprises a rectifier-separator circuit 24 delivering, from the corrected error signal $\hat{\epsilon}$ delivered by the servocontrol corrector circuit 5, the rectified, positive, respectively negative half-cycles of the corrected error signal $\hat{\epsilon}$ as described earlier in connection with FIG. 5a followed by a first, 25a, and by a second, 25b, circuit for calculating the square root of the amplitude of the rectified, positive, respectively negative half-cycles of the corrected error signal $\hat{\epsilon}$. Each calculation circuit 25a, 25b, delivers a signal proportional respectively to $\sqrt{\hat{\epsilon}a}$, $\sqrt{\hat{\epsilon}b}$, constituting respectively the differential control signals sa, sb. Thus, the lineariser 6 contains only the first two stages of the lineariser represented in FIG. 5a.

In a variant embodiment, the correction of the non-linearity due to the dependence on the force, exerted by the electromagnet respectively the counter-electromagnet, by virtue of the square of the current traversing their respective coil or of the magnetic flux thus created, is obtained by inserting into the servocontrol return loop, that is to say in the region of the connection wires F8, F9, Hall-effect probes with the amplifiers 7, respectively 8, of a square-function operator circuit delivering to the winding 11, 12, of the electromagnet respectively of the counter-electromagnet, a signal proportional to the square of the magnetic flux developed in each corresponding air gap 18, 19 (the lineariser circuit 6 of FIG. 5b then includes the one rectifier-separator circuit 24 described earlier in connection with FIG. 5a). Such a variant embodiment will not be described in further detail since it constitutes an equivalent to the embodiment of FIG. 5b.

It will be noted that the practical embodiment of the servocontrol corrector circuit 5 and of the lineariser circuit 6 can be either analogue, or digital.

In a digital version, these circuits can be advantageously produced by means of a fast signal processor such as the processor marketed under the reference TMS 320 C 25 by the company TEXAS INSTRUMENTS.

In an analogue embodiment version, the servocontrol corrector circuit 5 is produced by means of operational amplifiers and the lineariser circuit 6 can be produced from analogue multipliers such as the circuit marketed under the reference AD 534 by the company ANALOG DEVICES, these circuits making it possible to carry out the square root and multiplication operations.

As regards the installing of the Hall-effect sensors, the latter can be produced by means of sensors marketed by the company SPRAGUE under the reference UGN 3503 U.

The abovementioned Hall-effect sensors can be installed either in the air gap, or, more advantageously, in the magnetic circuit or in a tapping of the latter, so as to deliver a signal representative of the flux developed in the air gap. A description of a variant embodiment of the lineariser described earlier in connection with FIGS. 2 and 5b will now be given in connection with FIG. 5c, in the context of a digital control, in principle more precise than analogue control.

The lineariser described earlier in the description supplies only one coil 11 or 12 at a time. It is therefore liable to develop a distortion at the instant at which the applied force passed through the zero value. The coils used exhibit, in principle, a high impedance to current transients, so much so that the current, in the coil subject to excitation, does not have time to become established when the current in the coil switched off becomes null. This results in a corresponding disturbance to the force engendered. According to the corresponding embodiment, digital control makes it possible to use linearisation laws or procedures which are much less crude than simply calculating the square root as described earlier.

According to a particularly advantageous aspect, the linearisation procedure can consist in supplying each coil 11, 12, with a current of like intensity $I_0$ when the force requested is null. Thus, the forces engendered by each coil 11, 12, on the mobile part 17 compensate one another.

For small values of the force requested, the lineariser 6 is controlled in differential mode, the current in one of the coils is increased to a value $I_0+i$ and that in the other coil is reduced to the symmetric value $I_0-i$.

For high values of the force requested, that is to say when the differential value i reaches the value $I_0$, the current in the corresponding coil becomes null and that in the other coil reaches and then exceeds $2 I_0$, and can then be determined according to the law for the square root, since this comes back to the case described earlier in the description in which only one of the coils 11, 12 is supplied.

The air-gap compensations are carried out in the same way as described earlier.

Furthermore, in the case of the servocontrolling of the flux, rather than the servocontrolling of current, the previous considerations remain valid, the air-gap correction, however, being omitted. A corresponding illustrative servocontrol circuit is given below in connection with FIG. 5c. It will be understood for example that the corrector 5 and lineariser 6 circuits with, if appropriate, the air-gap correction 60, can be produced through a digital processor programmed so as to deliver the magnetic flux set points Fa and Fb such as represented in FIG. 5c, for a given force set point F subsequent to the processing of the correction module, under the conditions of differential or exclusive supply to both respectively Just one coil 11, 12.

A variant embodiment of the linear motor in accordance with the subject of the present invention will be described in connection with FIGS. 6a and 6b in the case where the mobile magnetic portion 17 is liable to be subject to a rotational displacement, about a centre of rotation C. In FIGS. 6a and 6b, the same numerical references designate the same elements as in the former figures.

As is apparent from studying FIG. 6a, the winding 11 is installed around the linear displacement path Δ which corresponds to a rotational displacement over an arc of a circle with subtended angle αf.

The mobile mechanical portion 17 is rotationally mobile, in the direction of displacement Δ, and guided mechanically so as to have only one degree of freedom with respect to the shell 1 of the electromagnet. The direction of displacement Δ is then substantially tangential to that of the lines of the magnetic field created by the electromagnet 11 in the air gap. The mobile magnetic portion 17 is subjected to a rotational displacement with respect to a centre of rotation C and is rotationally mounted with respect to a rotation spindle 21 which is mechanically integral with shell 1 and orthogonal to the displacement path Δ.

With FIG. 6b there has been represented a variant embodiment including, in a similar manner to FIG. 2, a magnet 11 and a counter-magnet 12.

It will certainly be understood, both in the case of FIG. 6a and in that of FIG. 6b, that the linear character of the displacement means that of the instantaneous angle of rotation of the mobile magnetic portion 17, provided that this angle is sufficiently small. The air gap values ef and efa, efb can then be equated with the corresponding instantaneous angle values αf, and αa, and αb, namely ef=R.αf, efa=R.αa and efb=R.αb. Such a condition is realised when, for a given angle αf, sin α=αf. The geometric parameters of the motor which is the subject of the invention then define an air-gap distortion factor of the form:

$$\frac{ef \cdot max}{ef \cdot min} = 1 + 2\frac{l}{R} \text{ with } l \leq R \text{ where}$$

ef.max designates the air-gap value at the far end of the mobile magnetic portion, ef.min designates the air-gap value at the near end of the mobile magnetic portion, the end close to the centre of rotation C, R designates the radius of curvature of the displacement path of the centre of gravity of the mobile magnetic portion, designates the half-aperture dimension of the electromagnet respectively of the counter-electromagnet, or half-length of the mobile magnetic portion 17.

For a practical embodiment, the angle of deflection $\alpha f_M$ or $\alpha a_M$, $\alpha b_M$ of the mobile magnetic portion will be taken less than or equal to 10 degrees.

The variable-reluctance linear motor which is the subject of the present invention, as represented in FIGS. 6a or 6b, in its rotational displacement version can be used in all cases where it is necessary to precisely control high-frequency, low-amplitude oscillating rotational motions, for example for the active control of pressure pulsations in flows with the aid of an oscillating butterfly valve mounted rotatably in a pipe.

A variable-reluctance servocontrolled linear motor has thus been described which is particularly powerful insofar as, within a small volume, small bulk and low weight, this type of motor makes it possible, firstly, to exert sizeable forces, it thus being possible to use this type of motor to ensure the reduction or suppression of the vibrations of machines or of motors as was described in French Patent Application 90 01075 filed in the name of the Applicant Company on 30th Jan. 1990.

Furthermore, the the variable-reluctance servocontrolled linear motor which is the subject of the present invention is, secondly, particularly advantageous insofar as linearity of displacement of the mobile rig, solely dependent on the performance of the electronic components constituting the servocontrol chain, can be obtained, it then being possible to make the linearity error of the entire system equal to a value of the order of 0.1%.

Such a feature, together with that according to which the measurement of the displacement can be effected with respect to an origin reference value, zero value in the absence of any drift in this zero value, makes it possible to envisage the most diverse applications dealing with the correction of position or with the correction of attitude of sizeable mechanical structures.

Lastly, the characteristic of linearity of the response of the servocontrolled linear motor which is the subject of the present invention associated with the value of the band width or of the cut-off frequency of the motor makes it possible to envisage the corresponding applications dealing with sound reproduction, the variable-reluctance servocontrolled linear motor which is the subject of the present invention then playing the role of a transducer which is comparable, and in any event superior, to the conventional type of electro-dynamic motor, it being possible for the constraint relating to the mechanical impedance of the diaphragm associated in such an application with the mobile rig, and in particular with the guide finger 20 of the linear motor which is the subject of the present invention in order to constitute, for example, a loudspeaker, to be rendered as small as possible, or in any event fully compensated by the servocontrol correcter circuit 5 and by the lineariser circuit in order to ensure faithful reproduction of the control signal and the translation of the latter into the form of corresponding sound vibrations.

I claim:

1. A variable-reluctance servocontrolled linear motor, said linear motor comprising:

at least one electromagnet exerting, during operation, a force of attraction, said electromagnet producing magnetic field lines and comprising a shell forming a magnetic circuit and a winding disposed around a linear displacement path, at least one movable magnetic portion movable in a direction of displacement and guided mechanically so as to have only one degree of freedom with respect to said shell of the electromagnet, the direction of the displacement being substantially tangential to that of the magnetic field lines produced by the electromagnet, and an air gap being defined between said shell and said movable magnetic portion, means for detecting the displacement of the said movable magnetic portion and for producing a displacement signal sd representative of the displacement of said movable magnetic portion, said detector means comprising a measurement sensor for detecting a length of the air gap between the shell and the movable magnetic portion, subtracter means for receiving, at a first, positive input thereof, a displacement control signal e for the movable magnetic portion, and, at a second, negative input thereof, said displacement signal and for producing a displacement error signal $\epsilon$ for the movable magnetic portion with respect to the displacement control signal, a current amplifier circuit for receiving the said error signal $\epsilon$ and for producing a corresponding supply current for said winding, and restoring means for said movable magnetic portion for exerting on said movable magnetic portion, a restoring force opposed to the force exerted by the electromagnet.

2. The linear motor according to claim 1, wherein said movable portion is subjected to a rectilinear displacement, and said movable magnetic portion comprises a guide member, mounted slidably with respect to the shell along the displacement path, said restoring means exerting a restoring force substantially tangential to the displacement path.

3. The linear motor according to claim 1, wherein said movable portion is subjected to rotational displacement with respect to a center of rotation C, said movable magnetic portion comprising a rotation spindle mechanically integral with said shell and orthogonal to the displacement path, said movable magnetic portion being mounted rotatably about said rotation spindle.

4. The linear motor according to claim 1, wherein said restoring means comprises a restoring spring of helical spring type.

5. The linear motor according to claim 1, wherein said electromagnet includes a first shell forming a first magnetic circuit, a first winding and a guide member, said restoring means comprising:

a counter-electromagnet including a second shell forming a second magnetic circuit and a second winding and being arranged so that said counter-electromagnet and said electromagnet face one another on either side of the movable magnetic portion, said guide member extending symmetrically with respect to the movable magnetic portion, and guiding of the movable magnetic portion in the operation to the motor being simultaneously provided by said first shell of said electromagnet and said second shell of said counter-electromagnet, and symmetric control means for providing symmetric control of the electromagnet and counter-electromagnet, respectively, so as to ensure delivery to said first and second windings of the electromagnet and counter-electromagnet respectively a supply current under symmetric excitation conditions.

6. The linear motor according to claim 5, wherein said symmetric control means includes:

differential displacement detector means for detecting differential displacement of said movable magnetic portion, and for supplying to the negative input of said substracter a signal sd representative of differential displacement of the movable magnetic portion with respect to the shells of the electromagnet and the counter-electromagnet with regard to an equilibrium origin position, a symmetrically excited current amplifier circuit including a symmetric control module receiving the error signal delivered by the substracter means and producing first and second symmetric excitation control signals, and first and second current amplifiers respectively receiving the first and second symmetric excitation control signals and supplying to the windings of the electromagnet and counter-electromagnet, a supply current under symmetric excitation.

7. The linear motor according to claim 6, wherein said differential displacement is detector means of a capacitive type and comprises:

a bridge circuit including two first adjacent branches formed by the capacitances of lengths of air gaps formed respectively between the shell of the electromagnet and a first side of the facing movable magnetic portion, and the shell of the counter-electromagnet and a second side of the facing movable magnetic portion, two second adjacent branches formed by equal resistances, a first diagonal formed by a generator of periodic signals whose fundamental frequency is substantially greater than the cut-off frequency of the servocontrolled linear motor, a second diagonal for producing a differential measurement signal (vm) vm representative of the signal differential between the movable magnetic portion and a common point of the two second adjacent branches, a demodulator circuit, operating at the frequency of the periodic signals, for receiving the said differential measurement signal and for producing an amplitude envelope signal corresponding to the amplitude envelope of the differential measurement signal, a low-pass filtering circuit for receiving said amplitude envelope signal and for producing said signal sd (sd) representative of the differential displacement of the movable magnetic portion.

8. The linear motor according to claim 6, wherein said symmetric control module comprises:

a servocontrol corrector circuit for maintaining stability of the servocontrol as a function of a mechanical impedance or load to which the motor is connected, said servocontrol corrector circuit receiving the error signal $\epsilon$ and producing a corrected error signal $\hat\epsilon$ and a lineariser circuit for controlling the windings of the electromagnet and the counter-electromagnet by servocontrolling the current, so that the displacement of the movable magnetic portion is linear in the direction of displacement $\Delta$ with respect to the input control signal e.

9. The linear motor according to claim 8, wherein said lineariser circuit provides current servocontrol, and comprises:

a rectifier-separator circuit for receiving the corrected error signal $\hat{\epsilon}$ produced by the servocontrol corrector circuit, and for producing rectified positive and negative half-cycles, respectively, of the corrected error signal e (e), first and second circuits for calculating the square root of the amplitudes of said rectified positive half-cycles and negative half-cycles of the corrected error signal $(\hat{\epsilon})$ $\hat{\epsilon}$ and for producing two signals proportional to $\sqrt{\hat{\epsilon}a}$, $\sqrt{\hat{\epsilon}b}$, where $\sqrt{\hat{\epsilon}a}$, $\sqrt{\hat{\epsilon}b}$ designate said square root of the amplitude of said rectified positive half-cycles and negative half-cycles of said corrected error signal respectively, first and second correcting multiplier circuits for respectively receiving the two signals $\sqrt{\hat{\epsilon}a}$, $\sqrt{\hat{\epsilon}b}$ produced by the calculation circuits, together with further signals eo−d and eo+d, respectively representing the length of the air gaps, wherein eo is the length of the air gap when said movable magnetic portion is in a middle position and d is a displacement of said movable magnetic portion with respect to said middle position and for supplying a first symmetric control signal sa and a second symmetric control signal sb to said first and second current amplifiers, respectively.

10. The linear motor according to claim 8, wherein said lineariser circuit provides servocontrol of the magnetic flux of the electromagnet and counter-electromagnet, said shell of the electromagnet including, in the region of said air gap, a Hall-effect measurement probe for supplying a signal representative of the magnetic flux developed in said air gap to said current amplifier.

11. The linear motor according to claim 10, wherein said lineariser circuit comprises:

a rectifier-separator circuit for producing, responsive to corrected error signal $\epsilon$ produced by the servocontrol corrector circuit, respective rectified positive and negative half-cycles of the corrected error signal $(\hat{\epsilon})$, first and second circuits for respectively calculating the square root of the amplitudes of said rectified positive half cycles and said rectified negative half-cycles and for producing two signals proportional to $\sqrt{\hat{\epsilon}a}$, and $\sqrt{\hat{\epsilon}b}$, and constituting the respective symmetric control signals sa, sb.

12. The linear motor according to claim 8, wherein said servocontrol corrector and lineariser circuits are implemented by a programmed digital processor, said lineariser enabling development in each winding of a magnetic flux of a given intensity when there is no force requested of the motor and including means for a incrementing and decrementing said magnetic flux by a differential value, in one or the other of the windings with respect to the magnetic flux of given intensity, when the requested force does not exceed a specified value, and for providing respectively, zero magnetic flux and magnetic flux greater than twice the magnetic flux of given intensity when the requested force reaches values greater than said specified value of requested force.

13. The linear motor according to claim 6, wherein said symmetric control module comprises:

a servocontrol corrector circuit for maintaining stability of the servocontrol as a function of a mechanical impedance or load to which the motor is connected, said servocontrol corrector circuit receiving the error signal $\epsilon$ and producing a corrected error signal $\hat{\epsilon}$, and a lineariser circuit for controlling the windings of the electromagnet and the counter-electromagnet by servocontrolling magnetic flux, so that the displacement of the movable magnetic portion is linear in the direction of displacement $\Delta$ with respect to the input control signal e.

14. The linear motor according to claim 1, wherein said measurement sensor is inductive.

15. The linear motor according to claim 1, wherein said measurement sensor is capacitive.

* * * * *